June 19, 1962   H. C. STIEGLITZ   3,039,341
FOLLOW REST
Filed Aug. 24, 1959   3 Sheets-Sheet 1
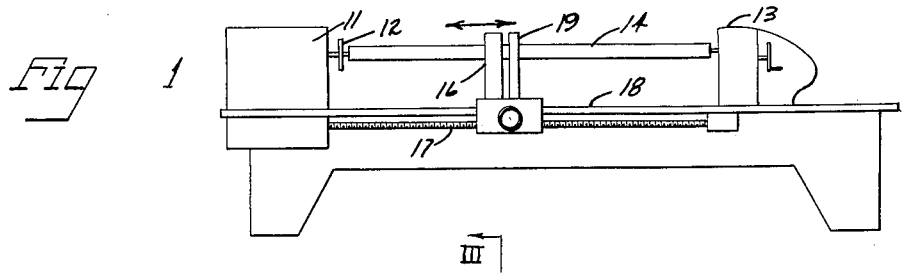
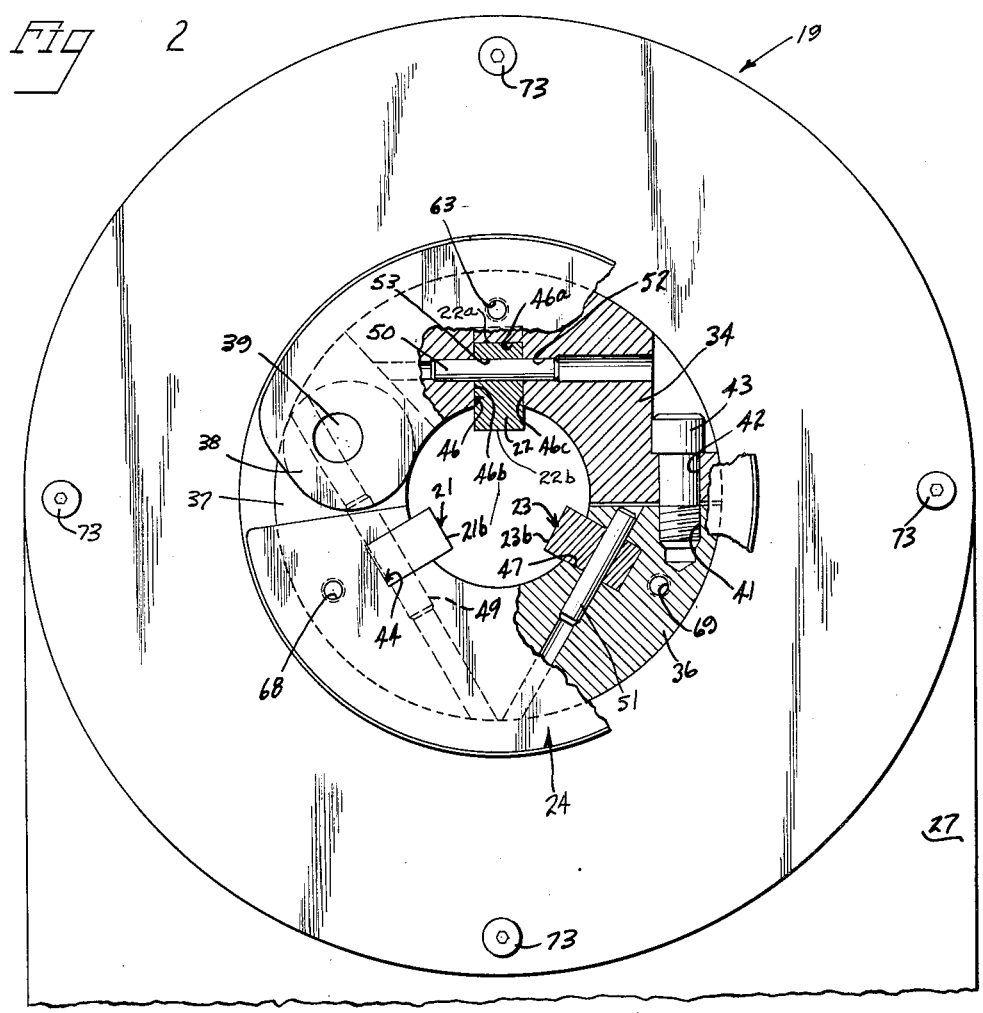
Inventor
HENRY C. STIEGLITZ June 19, 1962 H. C. STIEGLITZ 3,039,341
FOLLOW REST
Filed Aug. 24, 1959 3 Sheets-Sheet 2
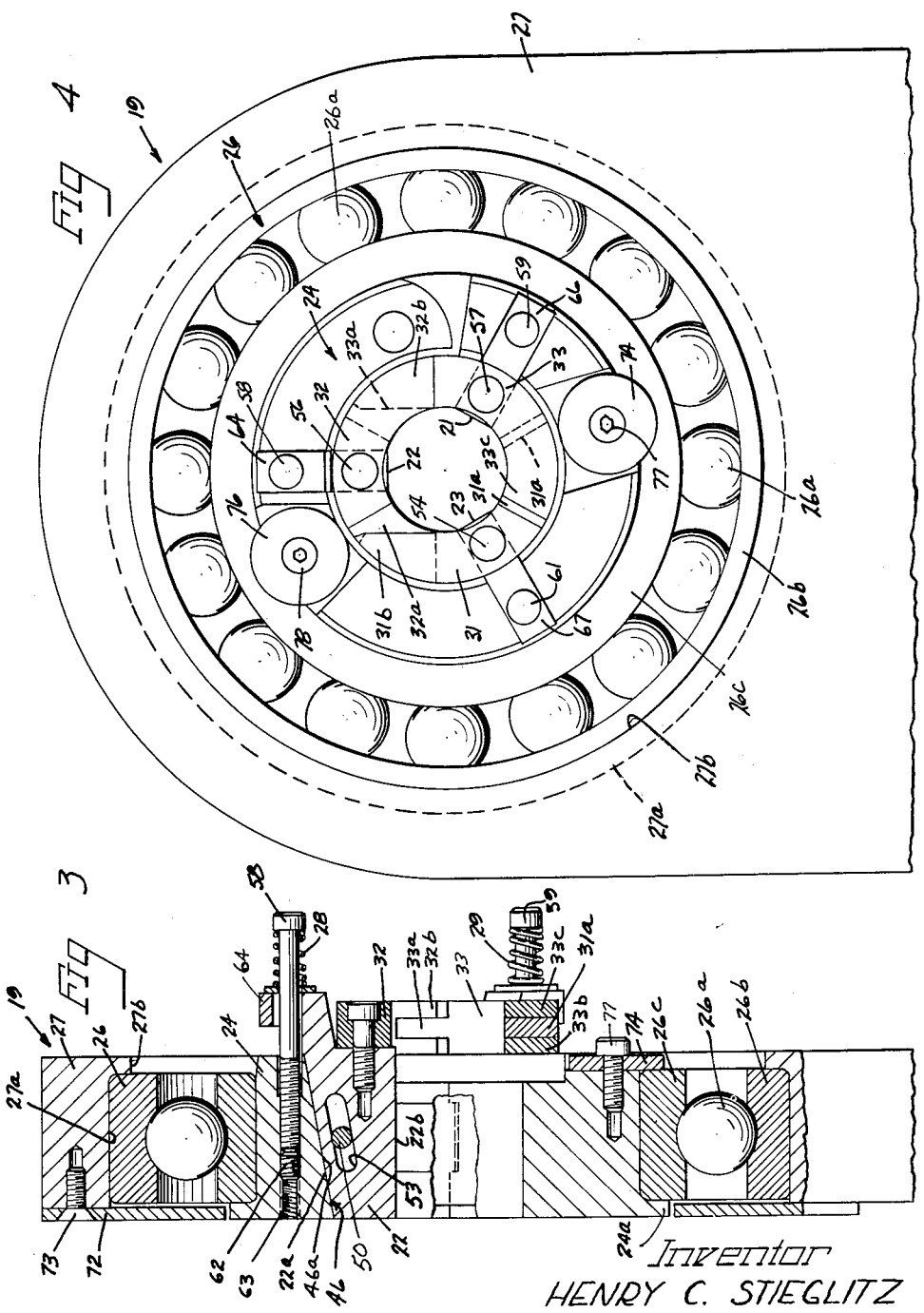
Inventor
HENRY C. STIEGLITZ
by Hill, Sherman, Meroni, Gross & Simpson Attys.

June 19, 1962  H. C. STIEGLITZ  3,039,341
FOLLOW REST
Filed Aug. 24, 1959  3 Sheets-Sheet 3
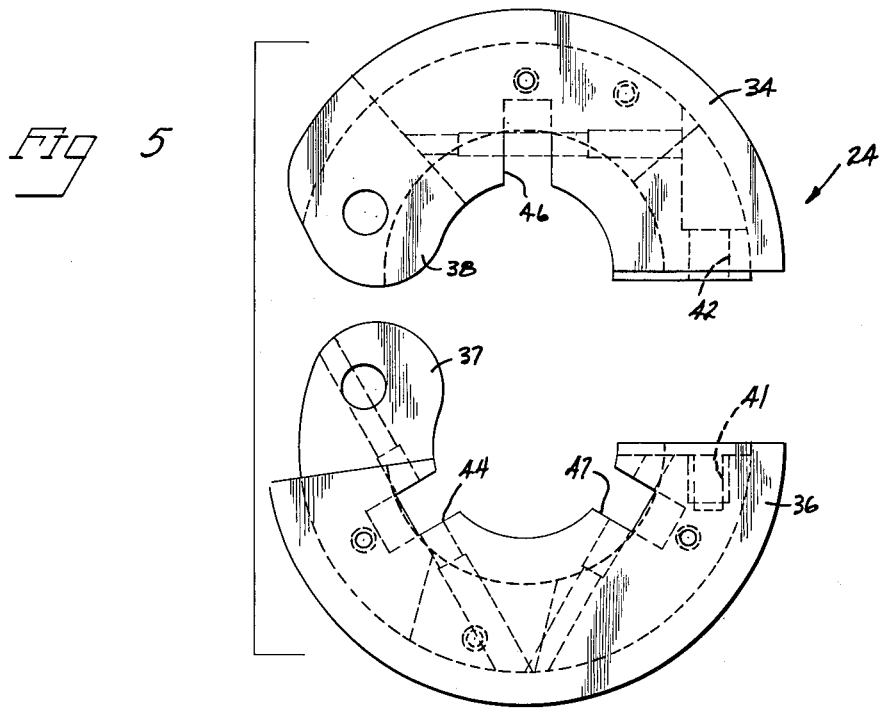
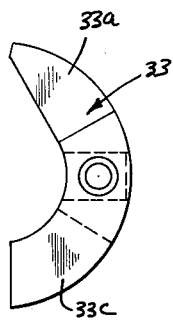
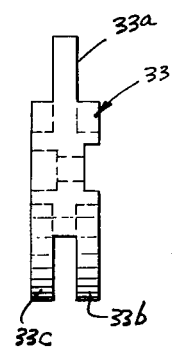
Inventor
HENRY C. STIEGLITZ
by Hill, Sherman, Meroni, Gross & Simpson Attys.

United States Patent Office 3,039,341
Patented June 19, 1962

3,039,341
FOLLOW REST
Henry C. Stieglitz, Mayfield Heights, Ohio, assignor to Thompson Ramo Wooldridge Inc., Cleveland, Ohio, a corporation of Ohio
Filed Aug. 24, 1959, Ser. No. 835,525
7 Claims. (Cl. 82—38)

The present invention relates to improvements in follow rests for providing a radial support for an elongated workpiece in a lathe or the like wherein the support is applied at a location adjacent a travelling tool which is operating on the workpiece.

In machining long small diameter cylindrical workpieces such as hollow tubes in lathes or similar equipment, it has been necessary to use steady rests, follow rests or box mills to support the work against deflection caused by the pressure of the cutting tool. These mechanisms have experienced inherent difficulties in cutting operation and in changing workpieces. Frequently the suporting members are arranged rigidly to support a workpiece of a specific diameter and where the diameter changes due to the tool wear or the introduction of a chip between the support and the workpiece, the work is either allowed to spring away from the tool or forced toward the tool. This results in the generation of a diameter different from that for which the support was set. Also minor changes in tolerance in the original stock of material have adversely affected the desired results.

The present invention contemplates an improved follow rest which will move along the bed of a lathe or similar machine with the tool providing reliable support without being adversely affected by varying operating conditions and which is capable of reliable continual operation and can be readily changed for a new workpiece.

An object of the invention provides an improved follow rest which is mounted to travel directly behind a tool and does not depend upon the operator's skill in setting the tool cutting, operates independent of tool wear, and is not adversely affected by the appearance of chips between the work and support.

Another object of the invention is to provide an improved follow rest which will not allow any running clearance between the work and the support.

A further object of the invention is to provide an improved follow rest for an elongated workpiece which is simply and quickly removed and shifted to the head end of the new workpiece.

A still further object of the invention is to provide an improved follow rest having movable spring biased jaws which automatically center the workpiece and which are provided with improved timing means for insuring that the jaws will advance uniformly to center the workpiece.

Other objects and advantages will become more apparent with the teaching of the principles of the invention in connection with the disclosure of the preferred embodiment thereof in the specification, claims and drawings, in which:

FIGURE 1 is a front elevational view of a lathe incorporating a follow rest in accordance with the principles of the present invention;

FIGURE 2 is an enlarged side elevational view of a follow rest constructed in accordance with the principles of the present invention;

FIGURE 3 is a vertical sectional view taken from substantially along line III—III of FIGURE 2;

FIGURE 4 is a side elevational view of the follow rest taken from the side opposite the view of FIGURE 2;

FIGURE 5 is an exploded elevational view illustrating the jaw carrier of the follow rest;

FIGURE 6 is a detailed side elevational view of a timing lug of the follow rest; and FIGURE 7 is a detailed front elevational view of the timing lug of FIGURE 6.

As shown in the drawings:

FIGURE 1 illustrates a lathe having a head end 11 with a chuck 12 (which is shown schematically) for griping and driving a workpiece 14 in rotation. At the other end of the workpiece is a tail stock 13 for holding the other end of the workpiece 14 during rotation. A tool holder 16 is driven along parallel to the axis of the work by threaded screw 17 extending along a bed 18 of the lathe to perform a cutting operation or the like on the work. Mounted on the tool holder 16 is a follow rest 19 in accordance with the principles of the present invention, with the follow rest being shown in detail in FIGURES 2 through 7.

As illustrated in FIGURES 2, 3 and 4, the follow rest 19 concludes the plurality of gripping jaws 21, 22 and 23 which are movably supported in a jaw carrier 24. The jaw carrier is rotatably supported for rotation coaxial with the axis of the workpiece in a bearing 26 which is held in a bearing holder 27 that is adapted to be supported on the tool holder 16 for movement along the workpiece directly behind the tool holder. The jaws are guided in an axial direction which is the same direction in which the follow rest is advanced with the tool and they are simultaneously biased, such as by springs 28 and 29 toward a work gripping position. The jaws automatically center the work by the action of position control means preferably in the form of position control or timing lugs 31, 32 and 33 that insure the uniform advancement of the jaws. The jaw carrier is removable from the bearing 26 and is releasable to open the jaws in order that the follow rest may be easily moved to the head end of a new workpiece.

As illustrated in FIGURES 2 and 3, and as illustrated in detail in FIGURE 5, the jaw carrier has a first arcuate element 34 and a second arcuate element 36 hinged thereto. The element 34 is provided with a bifurcated end 38 which receives an end 37 of the element 36 and the ends are tied together by hinge pin 39 so that the carrier elements can be pivoted to open position. For holding the carrier elements together during normal operation, the element 36 is provided with a threaded hole 41 and the element 34 is provided with an aligned hole 42 and a locking stud 43 is inserted into the hole 42 and threaded into the hole 41. This stud can be removed when the jaw carrier elements are to be separated and when the carrier is drawn out from inside of the bearing 26, as will be described.

The carrier is provided on its inner surface with circumferentially separated axially extending inwardly facing recesses forming jaw guides 44, 46 and 47. In the preferred form, the carrier is illustrated as provided with three jaws and three jaw guides, which is a minimum number, but as will be appreciated by those skilled in the art, additional jaws and guides may be provided in some circumstances. The jaw guides are of similar construction and therefore only the guide 46 need be described in detail.

The jaw guide is provided with an outer surface 46a which extends in an axial direction and which tapers radially inwardly in the direction in which the carrier advances during operation, as illustrated by the arrow in FIGURE 1. The guide is provided with parallel side walls 46b and 46c for slidably holding the jaw 22. As illustrated in FIGURE 3, the jaw is provided with a tapered outer surface 22a which coacts with the guide recess surface 46a to hold the inner gripping surface 22b of the jaw parallel to the axis of the workpiece. Similarly, the jaws 21 and 23 have their guide recesses 44 and 47 shaped so that their gripping faces 21b and 23b will remain parallel to the axis of the workpiece. Also, the guide recesses 44, 46 and 47 are shaped with similar incline so that with uniform axial advancement of the jaws they will advance at a uniform rate in a radial direction to maintain the workpiece centered.

The jaws are held in their guide recesses by chordally extending pins 49, 50 and 51. The pins are held in holes bored in the carrier, as illustrated by the hole 52 for the pin 50, and the pins extend through elongated angular slots such as 53 in the jaw 22 for the pin 50. The slots extend parallel to the surfaces at the base of the recesses to aid in guiding the jaws toward their supporting or gripping positions.

Means are provided to insure that the jaws will advance at a uniform rate radially toward the center of the workpiece. With the slopes of the jaw guiding recesses being uniform, this is accomplished by timing means which insures a uniform advancement of the jaws in an axial direction. The timing means are shown in the form of the timing lugs 31, 32 and 33. Each of the timing lugs is secured to the face of the carrier 24 by a pin shown at 54, 56 and 57 for the lugs 31, 32 and 33 respectively. The timing lugs are arcuate in shape, as shown by the detailed illustration of the lug 33 in FIGURES 6 and 7. While the lugs are somewhat different in construction, they are similar to lug 33, which is shown in detail in FIGURES 6 and 7. Each of the lugs is provided with a single finger at one end which projects between the sides of a bifurcated end of the next adjacent lug which permits the lugs to move relatively radially inwardly but prevents any axial movement except for uniform movement by all lugs. Thus, lug 33 has a finger 33a at one end and the other end is bifurcated with sides 33b and 33c. As illustrated in FIGURES 3 and 4, a finger 31a of the lug 31 projects between the sides 33b and 33c of the lug 33. The finger 33a projects between the sides of the bifurcated end 32b of the lug 32. A finger 32a of the lug 32 projects between the sides of a bifurcated end of 31b of the lug 31. The finger 31a of the lug 31 projects between the sides 33b and 33c of the lug 33. While the timing lugs are slightly different in construction, each is provided with an end with a single finger with the other end being bifurcated and the lugs are arranged so the fingers extend in the same rotational direction.

Thus the jaws are restrained to uniform advancement by the timing lugs which interconnect the jaws.

The jaws are urged toward the holding position by springs such as 28 and 29. The spring 28 surrounds a spring bolt 58 and the spring 29 surrounds a spring bolt 59, while still another spring (not shown) surrounds a spring bolt 61, FIGURE 4. Each of the spring bolts is adjustably threaded into the carrier 24, as illustrated in FIGURE 3. A threaded locking stud 62 threads into the threaded axially extending hole 63, for the spring bolt 58, and locks the spring bolt in adjusted position. Spring bolts 58, 59 and 61 pass through openings in ears 64, 66 and 67 on the jaws 22, 21 and 23 respectively. While the tension of the individual springs can be adjusted, non-uniformity of application of spring pressure will not damage the effective operation in the mechanism inasmuch as the jaws are restrained to advancing uniformly by the timing lugs. The bolts 59 and 61 are threaded into threaded holes 68 and 69 respectively, as illustrated in FIGURE 2.

The jaw carrier 24 is removably mounted in the bearing 26 and can be slid axially out of the bearing to be opened. The bearing 26 is illustrated as a conventional ball bearing assembly having annularly arranged balls 26a held between outer and inner races 26b and 26c. The bearing assembly 26 is mounted in the bearing holder 27 which is provided with an annular bearing receiving surface 27a and inwardly annularly disposed flange 27b to hold the bearing assembly in one axial direction. The bearing assembly is held on the other axial direction by a bearing retaining ring 72 held onto the bearing holder 27 by screws 73.

The carrier 24 has an annular outwardly extending flange 24a which engages the side of the inner race 26c when the carrier is in operative position. The carrier is held to the inner race by carrier holding washers 74 and 76 secured by studs 77 and 78 which are threaded into the carrier 24. These studs 77 and 78 are removed when the carrier is to be slid out of the bearing, to the left as illustrated in FIGURE 3.

In operation, the follow rest 19 is supported on the tool holder 16 and the jaw carrier 24 is clamped on a workpiece and the locking bolt 43 is inserted. The carrier 26 is slid into the bearing and the bolts 77 and 78 are threaded in place to hold the carrier within the bearing. As the workpiece rotates the bearing rotatably supports the carrier and its jaws which rotate with the workpiece. As the holder 27 with its supported assembly is moved axially in a carrier advancing direction, which is the same direction in which the tool is advanced, as indicated by the arrow in FIGURE 1, the jaws will continually be held to a supporting position against the workpiece by the action of the springs 28 and 29. The jaws will be advanced uniformly in an axial direction as insured by the timing lugs 31, 32 and 33. The jaws as urged by their springs to close down on the workpiece and provide a rigid support therefore. The tool bit precedes these supports by approximately one inch and generates the diameter that the jaws bear against. As the support travels axially along the workpiece, the clamping force of the jaws on the workpiece tends to make them remain stationary and as the carrier around the jaws advances, the tension of the jaws releases. This release in practice proves to be sufficient to relieve the tension of the jaws so that the springs push the jaws forward.

The wedge angle on the jaws, that is, the angle of the outer surface 22a of jaw 22, which is the same as the angle of surface 46a of the jaw guiding recess, is small and is preferably on the order of 10°. This results in a high locking force and the pressure from the tool against the workpiece is at a substantial mechanical disadvantages insofar as opening the jaws. Because the jaws are continually opening and closing as the work progresses along the axis of the workpiece (or assumes a fixed state of minimum clearance), tool wear will be compensated for. If the tool were retracted or advanced toward or away from the work to achieve a slight change in diameter, the jaws would automatically compensate for the diameter change and continue to offer support to the work.

Because of the wedge action inherent in the arrangement provided by the structure disclosed, it will be noted that the device can be moved only in the advancing direction, which is the direction of the arrow as illustrated in FIGURE 1, and cannot be moved to the other direction. Any attempt to move the assembly in the opposite direction would result only in locking the jaws tighter on the workpiece. The jaw carrier member is made so that it slips out of the supporting bearing in the direction of the jaw release and when removed from the bearing can be opened and removed from the shaft. It can then be retracted to the start of a new cut on a new workpiece and again assembled with the bearing. Chips will not get under the jaws inasmuch as they are revolving with the work.

Thus it will be seen that I have provided a new and improved follow rest which avoids disadvantages heretofore present in the art and which meets the objectives and advantages set forth above.

The drawings and specification present a detailed disclosure of the preferred embodiments of the invention, and it is to be understood that the invention is not limited to the specific forms disclosed, but covers all modifications, changes and alternative constructions and meth-

I claim as my invention:

1. A follow rest mechanism comprising a plurality of wedge shaped work engaging jaws for supportingly engaging a workpiece, a jaw carrier having first and second arcuate elements for supporting said jaws, means hinging said jaw elements together at one side, releasable carrier locking means at the other side of said carrier elements for removing the jaws from supporting engagement with a workpiece, means defining a plurality of radially inwardly facing recess forming jaws guides in said carrier extending axially in a carrier advancing direction and extending radially inwardly in a uniform slope in said advancing direction, chordally extending jaw retaining pins across each of said recesses, means defining a pin receiving retaining slot in each of said jaws, an individual timing lug attached to each of said jaws, means interconnecting said timing lugs preventing relative axial movement and permitting relative movement circumferentially toward each other so that the jaws will be limited to simultaneous advance in said advancing direction, biasing means on the carrier biasing the jaws on said guides toward the workpiece, a bearing rotatably supporting the jaw carrier for rotation about an axis coaxial with the workpiece, and a bearing holder adapted to be supported for movement along the workpiece with a tool holder.

2. A follow rest mechanism comprising a plurality of work engaging jaws for supportingly engaging a workpiece, an annular jaw carrier for supporting the jaws, means defining a plurality of radially inwardly facing recesses forming jaw guides in said carrier extending axially in a carrier advancing direction and extending radially inwardly in a uniform slope in said advancing direction, chordally extending jaw retaining pins across each of said recesses, means defining a pin receiving retaining slot in each of said jaws, position control means connected to said jaws maintaining them at an equal advanced position toward the axial center of the workpiece in movement along said jaw guides, biasing means on the carrier biasing the jaws on said guides toward the workpiece in said advancing direction, a bearing rotatably supporting the jaw carrier for rotation about an axis coaxial with the workpiece, and a bearing holder supported for movement along the workpiece with a tool holder in said carrier advancing direction.

3. A follow rest mechanism comprising a plurality of work engaging jaws for supportingly engaging a workpiece, a jaw carrier having first and second arcuate elements for supporting said jaws, means hinging said carrier elements together at one side, releasable carrier locking means at the other side of said carrier elements for removing the jaws from supporting engagement with a workpiece, jaw guides on said carrier guiding each jaw in a path extending radially inwardly toward a workpiece to supportingly engage the workpiece and hold it against radial deflection, biasing means on the carrier biasing the jaws on said guides toward the workpiece, a bearing rotatably supporting the jaw carrier for rotation about an axis coaxial with the workpiece, a bearing holder supported for movement along the workpiece with a tool holder, and means for releasably connecting said carrier to said bearing so that the carrier elements can be pivotally opened and the carrier and jaws moved to the starting end of a workpiece independently of the bearing and bearing holder.

4. A follow rest mechanism comprising a plurality of work engaging jaws for supportingly engaging a workpiece, a jaw carrier supporting said jaws, jaw guides on said carrier guiding each jaw in a path extending radially inwardly toward a workpiece to supportingly engage the workpiece and hold it against radial deflection, biasing means on the carrier biasing the jaws on said guides toward the workpiece, position control means connected to said jaws maintaining them equidistant from an axial center coaxial with the workpiece, a bearing rotatably supporting the jaw carrier for rotation about an axis coaxial with the workpiece so that the jaws will rotate with the workpiece, a tool carriage movable axially along the workpiece, and a bearing holder secured to the carriage for movement along the workpiece with the tool carriage.

5. A follow rest mechanism comprising a plurality of work engaging jaws for supportingly engaging a workpiece, a jaw carrier supporting said jaws, jaw guides on said carrier for each of the jaws extending axially in a carrier advancing direction and extending radially inwardly so that the jaws will move toward the workpiece when moved axially in said advancing direction, biasing means on the carrier biasing the jaws on said guides toward the workpiece in said advancing direction, position control means connected to said jaws maintaining them at an equal advanced position toward the axial center of the workpiece in movement along said jaw guides, a bearing rotatably supporting the jaw carrier for rotation about an axis coaxial with the workpiece so that the jaws will rotate with the workpiece, a tool carriage movable axially along the workpiece, and a bearing holder mounted on the carriage for movement along the workpiece with the tool carriage in said carrier advancing direction.

6. A follow rest mechanism comprising a plurality of work engaging jaws for supportingly engaging a workpiece, a jaw carrier supporting said jaws, jaw guides on said carrier guiding each jaw in a path extending radially inwardly toward a workpiece to supportingly engage the workpiece and hold it against radial deflection, biasing means on the carrier biasing the jaws on said guides toward the workpiece, a bearing rotatably supporting the jaw carrier for rotation about an axis coaxial with the workpiece so that the jaws will rotate with the workpiece, a tool carriage movable axially along the workpiece, a bearing holder secured to the carriage for movement along the workpiece with the tool carriage, and means for releasably connecting said carrier to said bearing so that the carrier and jaws can be moved to the starting end of the workpiece independently of the bearing and bearing holder.

7. A follow rest mechanism comprising a plurality of work engaging jaws for supportingly engaging a workpiece, a jaw carrier supporting said jaws, jaw guides on said carrier for each of the jaws extending axially in a carrier advancing direction and extending radially inwardly so that the jaws will move toward the workpiece when moved axially in said advancing direction with the guides for each jaw following an identical path with respect to axial and radial advance, biasing means on the carrier biasing the jaws on said guides toward the workpiece in said advancing direction, an individual position control lug attached to each of said jaws, means interconnecting said lugs preventing relative axial movement and permitting relative movement radially toward each other so that the jaws will be limited to simultaneous advance in said advancing direction, a bearing rotatably supporting the jaw carrier for rotation about an axis coaxial with the workpiece so that the jaws may rotate with the workpiece about the workpiece axis, a tool carriage movable axially along the workpiece, and a bearing holder secured to the tool carriage for movement along the workpiece with the carriage in said carrier advancing direction.

References Cited in the file of this patent

UNITED STATES PATENTS

| | | |
|---|---|---|
| 1,067,143 | Schellenbach | July 8, 1913 |
| 2,397,561 | Petsche | Apr. 2, 1946 |
| 2,496,995 | Gorton | Feb. 7, 1950 |
| 2,547,529 | Lichtenberg | Apr. 3, 1951 |